(12) United States Patent
Wang

(10) Patent No.: US 7,825,549 B2
(45) Date of Patent: Nov. 2, 2010

(54) LINEAR MOTOR WITH REDUCED COGGING

(75) Inventor: Xiaopeng Wang, Singapore (SG)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 0 days.

(21) Appl. No.: 12/377,410

(22) PCT Filed: Dec. 20, 2006

(86) PCT No.: PCT/US2006/062351

§ 371 (c)(1),
(2), (4) Date: Feb. 13, 2009

(87) PCT Pub. No.: WO2008/079144

PCT Pub. Date: Jul. 3, 2008

(65) Prior Publication Data

US 2010/0225179 A1    Sep. 9, 2010

(51) Int. Cl.
*H02K 41/02*    (2006.01)
(52) U.S. Cl. .................................. 310/12.26; 310/12.24
(58) Field of Classification Search ............. 310/12.26, 310/12.24
See application file for complete search history.

(56) References Cited

U.S. PATENT DOCUMENTS

| | | | |
|---|---|---|---|
| 3,828,211 A * | 8/1974 | Laronze | 310/13 |
| 4,912,746 A * | 3/1990 | Oishi | 310/12.01 |
| 5,642,013 A | 6/1997 | Wavre | |
| 5,909,066 A | 6/1999 | Nanba et al. | |
| 5,910,691 A * | 6/1999 | Wavre | 310/12.18 |
| 6,949,846 B2 * | 9/2005 | Sugita et al. | 310/12.15 |

FOREIGN PATENT DOCUMENTS

JP    2003 299342 A    10/2003

OTHER PUBLICATIONS

International Search Report and Written Opinion for International Application No. PCT/US2006/062351 dated Aug. 31, 2007.

* cited by examiner

*Primary Examiner*—Dang D Le
(74) *Attorney, Agent, or Firm*—Christopher M. Spletzer, Sr.

(57) ABSTRACT

A linear motor is provided including a magnet track including a plurality of permanent magnets, and a coil assembly including a plurality of laminations. The coil assembly defines a plurality of teeth having slots therebetween. The plurality of teeth include (1) two end teeth and (2) at least one non-end tooth arranged between the two end teeth. Each of the two end teeth defines an end profile including a first surface and a second surface. The first surface and the second surface are separated by a step which is substantially perpendicular to a plane defined by the plurality of magnets. The linear motor also includes a plurality of coils at least partially disposed in at least a portion of the slots defined by the plurality of teeth.

16 Claims, 5 Drawing Sheets

US 7,825,549 B2

LINEAR MOTOR WITH REDUCED COGGING

CROSS REFERENCE

This application claims the benefit of International Application No. PCT/US2006/062351 filed Dec. 20, 2006, the content of which is incorporated herein by reference.

FIELD OF THE INVENTION

The present invention relates to linear motor systems, and more particularly, to linear motor systems with reduced cogging.

BACKGROUND OF THE INVENTION

Linear motors are well known in the art and used in many different industries. For example, linear motor systems are used in wire bonding machines to provide high speed linear motion along various axes. For example, in certain wire bonding machines, linear motors are used to provide precise high speed motion along an x-axis and a y-axis of the machine.

One problem well known in the field of linear motors is cogging. For example, cogging forces in linear iron-core synchronous/brushless DC motors is undesirable because it tends to act as a disturbance to the current/force loop of a servo system, thereby compromising servo system performance.

In linear motors including coil assemblies (e.g., laminated armatures including teeth configured to be wound with coils), one method of reducing cogging forces has been related to the design of the end teeth of the coil assembly. For example, U.S. Pat. No. 4,912,746 to Oishi reduces the unit volume of the teeth at the axial ends of the armature core by cutting out a section of the end teeth. In another example, U.S. Pat. No. 5,910,691 to Wavre provides end teeth 78, 80 having a first segment 84 adjacent a second sloped segment 86.

Therefore, while prior art attempts at reducing cogging effects in linear motors by specialized design of the end teeth of an armature are known, increased pressure for reduced cogging in linear motors continues in the industry.

Thus, it would be desirable to provide a linear motor system with reduced cogging.

SUMMARY OF THE INVENTION

According to an exemplary embodiment of the present invention, a linear motor is provided. The linear motor includes a magnet track including a plurality of permanent magnets, and a coil assembly including a plurality of laminations. The coil assembly defines a plurality of teeth having slots therebetween. The plurality of teeth include (1) two end teeth and (2) at least one non-end tooth arranged between the two end teeth. Each of the two end teeth defines an end profile including a first surface and a second surface. The first surface and the second surface are separated by a step which is substantially perpendicular to a plane defined by the plurality of magnets. The linear motor also includes a plurality of coils at least partially disposed in at least a portion of the slots defined by the plurality of teeth.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

As used herein, the term "magnet track" is intended to refer to any of a number of structures in a linear motor including a plurality of permanent magnets arranged to magnetically interact with a coil assembly of the linear motor such that a desired linear motion of at least one of the magnet track and the coil assembly is provided. As such, the magnet track is not intended to be limited, for example, to any particular arrangement or spacing of the permanent magnets, nor is the magnet track intended to be limited to any particular support structure for the permanent magnets.

Figure 1:
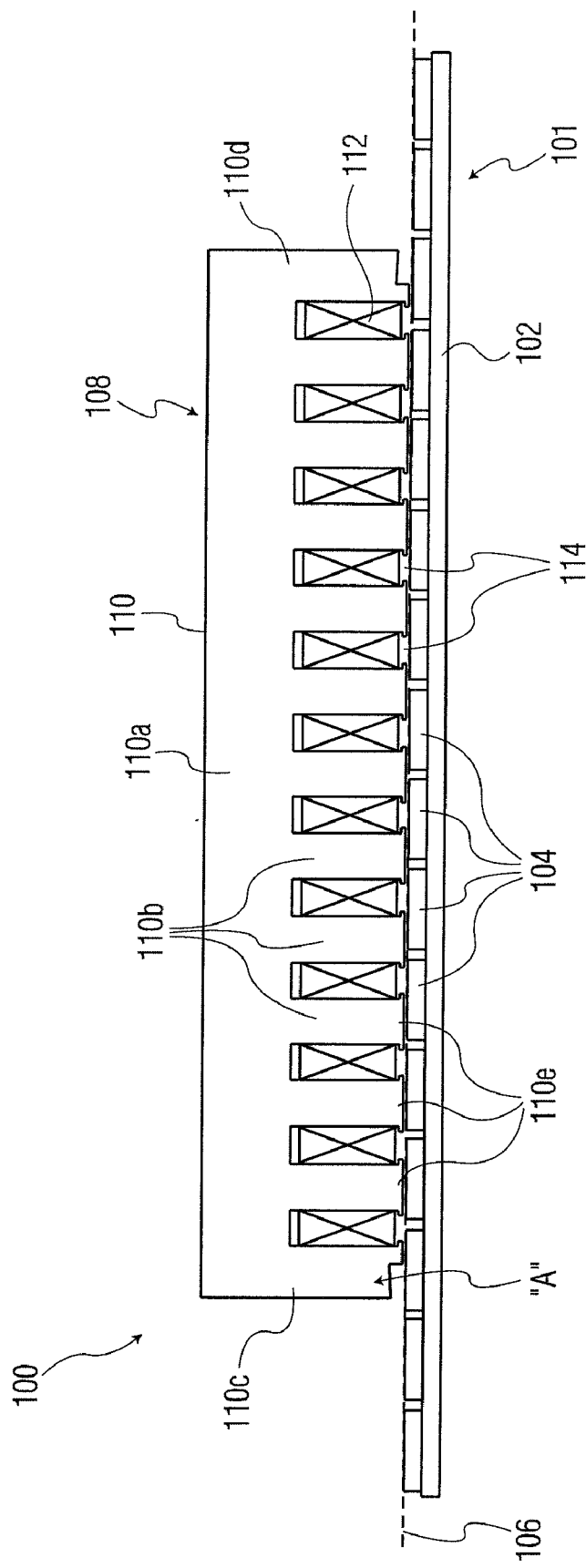
FIG. 1 is a cross-sectional view of a linear motor in accordance with an exemplary embodiment of the present invention.

FIG. 1 is a cross sectional view of linear motor 100. Linear motor 100 includes magnet track 101 and coil assembly 108. As is understood by those skilled in the art, certain components of linear motor 100 (e.g., electrical connections, etc.) have been omitted for simplicity.

Magnet track 101 includes support plate 102 (e.g., a steel plate) and a plurality of permanent magnets 104 disposed on support plate 102. For example, permanent magnets 104 may be glued or otherwise secured to support plate 102 at a predetermined spacing as is known to those skilled in the art. For purposes of describing certain exemplary features of the present invention, plane 106, which is substantially parallel to a top surface of permanent magnets 104, is shown in FIG. 1.

Coil assembly 108 includes a plurality of laminations 110 and a plurality of windings 112. Laminations 110 are stacked as is known to those skilled in the art, for example, to form an armature or the like. Exemplary materials for laminations 110 include silicon steel, low carbon steel, amongst many others. Stacked laminations 110 define base portion 110a and a plurality of teeth 110b extending from the base portion 110a. It is understood by those skilled in the art that base portion 110a may define certain features (e.g., alignment features, grooves, apertures, etc.) not shown in FIG. 1.

Slots 114 are defined between adjacent teeth 110b; between end tooth 110c and an adjacent tooth 110b; and between end tooth 110d and an adjacent end tooth 110b. In the exemplary embodiment of the present invention illustrated in FIG. 1, flanged portions 110e are defined at an end of each of teeth 110b. Thus, in the exemplary embodiment of the present invention illustrated in FIG. 1, the width of slot 114 is smaller between flanged portions 110e in contrast to the width of slot 114 along the remainder of the length of teeth 110b extending back towards base portion 110a.

Windings 112 (e.g., insulated windings) are provided in slots 114. For example, windings 112 may occupy each slot 114, or certain slots 114 may include windings 112 while other slots may remain empty. Further, a single slot 114 may be occupied by a single winding 112, or a single slot 114 may be occupied by portions of multiple windings 112. Further still, the windings 112 may occupy any portion (e.g., all, substantially all, half, etc.) of the volume of a slot 114, as is desired in the given application.

The stacked laminations 110 also define end teeth 110c and 110d extending from the base portion 110a. As discussed above, it is known that the end tooth design of a linear motor can have an effect on the cogging of the linear motor.

According to an exemplary embodiment of the present invention, an end profile of each of the end teeth includes a first surface and a second surface. The first surface and the second surface are separated by a step which is substantially perpendicular to a plane defined by a plurality of permanent magnets of the linear motor. Referring to the exemplary embodiment of the present invention illustrated in FIG. 1, end teeth 110c and 110d are each provided with such a step separating respective first and second surfaces, as will be described in greater detail with respect to FIG. 3A.

Figure 2:
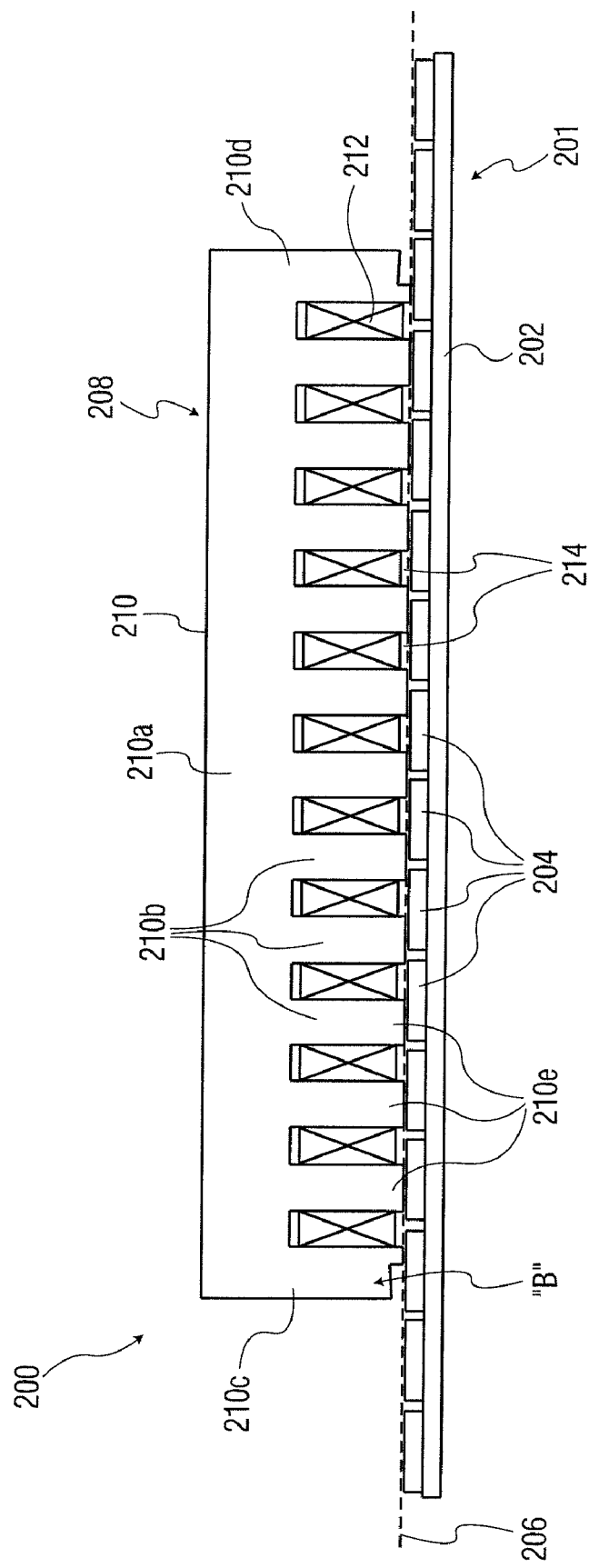
FIG. 2 is a cross-sectional view of a linear motor in accordance with another exemplary embodiment of the present invention.

FIG. 2 is a cross-sectional view of linear motor 200 in accordance with another exemplary embodiment of the present invention. Linear motor 200 includes magnet track 201 and coil assembly 208. Magnet track 201 includes support plate 202 (e.g., a steel plate) and a plurality of permanent magnets 204 disposed on support plate 202. For example, permanent magnets 204 may be glued or otherwise secured to support plate 202 at a predetermined spacing as is known to those skilled in the art. For purposes of describing certain exemplary features of the present invention, plane 206, which is substantially parallel to a top surface of permanent magnets 204, is shown in FIG. 2.

Coil assembly 208 includes a plurality of laminations 210 and a plurality of windings 212. Laminations 210 are stacked as is known to those skilled in the art, for example, to form an armature or the like. Stacked laminations 210 define base portion 210a and a plurality of teeth 210b extending from the base portion 210a. Slots 214 are defined between adjacent teeth 210b; between end tooth 210c and an adjacent tooth 210b; and between end tooth 210d and an adjacent end tooth 210b. In the exemplary embodiment of the present invention illustrated in FIG. 2, there are no flanged portions defined at an end of each of teeth 210b (as in the exemplary embodiment illustrated in FIG. 1), and as such, the width of slot 214 is substantially the same along the length of teeth 210b extending back towards base portion 210a.

Windings 212 are provided in slots 214. For example, windings 212 may occupy each slot 214, or certain slots 214 may include windings 212 while others remain empty. Further, a single slot 214 may be occupied by a single winding 212, or a single slot 214 may be occupied by portions of multiple windings 212. Further still, the windings 212 may occupy any portion (e.g., all, substantially all, half, etc.) of the volume of a slot 214, as is desired in the given application.

The stacked laminations 210 also define end teeth 210c and 210d extending from the base portion 210a. As discussed above, it is known that the end tooth design of a linear motor can have an effect on the cogging of the linear motor.

Referring to the exemplary embodiment of the present invention illustrated in FIG. 2, end teeth 210c and 210d are each provided with such a step separating respective first and second surfaces, as will be described in greater detail with respect to FIG. 3B.

Figure 3A:
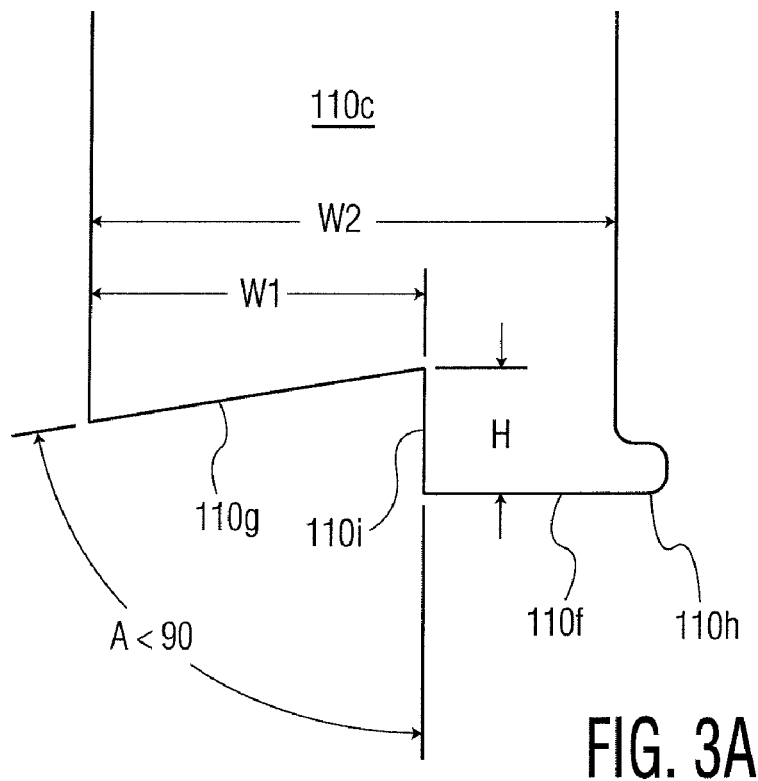
FIG. 3A is a partial view of an end tooth of a coil assembly of a linear motor in accordance with an exemplary embodiment of the present invention.

FIG. 3A is a partial view of end tooth 110c from linear motor 100 illustrated in FIG. 1 (and labeled as "A" in FIG. 1). While a detailed view of end tooth 110d is not provided in FIG. 3A, it may be considered as a mirror image of end tooth 100c (as shown in FIG. 1). Referring again now to FIG. 3A, the end profile of end tooth 110c includes first surface 110f and second surface 110g separated by step 110i. As illustrated by viewing FIGS. 1 and 3A in the aggregate, step 110i is substantially perpendicular to plane 106. First surface 110f is substantially parallel to plane 106, and second surface 110g is configured at an acute angle "A" with respect to step 110i. According to a preferred embodiment of the present invention, the acute angle "A" between second surface 110g and step 110i is between 60-90 degrees.

If first surface 110f is considered to be at the top of lamination 110 (such that base portion 110a is considered to be at the bottom of lamination 110), and if second surface 110g is considered to be below first surface 110f, then step 110i is a step downward. All of the exemplary steps illustrated in the present application (i.e., steps 110i, 210i, 310i, 410i, 510i, and 610i) are shown in this manner. While such an arrangement is preferred, the present invention also contemplates the alternative, that is, a step upward from first surface 110f to second surface 110g.

Contiguous with first surface 110f is flanged portion 110h, as the end portions of plurality of teeth 110b of linear motor 100 (illustrated in FIG. 1) include flanged portions 110e. Consequently, end tooth 110c (and end tooth 110d, while not illustrated except in FIG. 1) include a flanged portion (i.e., flanged portion 110h for end tooth 110c).

Also shown in FIG. 3A are widths "W1" and "W2," and height "H." As shown in FIG. 3A, width W1 is the width of the portion of end tooth 110c adjacent second surface 110g (i.e., width W1 is parallel to plane 106, so width W1 is not the same as the length of second surface 110g in FIG. 3A). Width W2 is the total width of the end tooth 110c (excluding the added width of flanged portion 110h in embodiments with such a flanged portion). Height H is the height of step 110i. The inventors have determined that certain ratios of W1 to W2, and of H to W1 provide particularly desirable benefits in terms of togging reduction. For example, according to an exemplary embodiment of the present invention the ratio of W1/W2 is between 0.4-0.7, with a specific example being a ratio of W1/W2 of 0.6. For example, according to an exemplary embodiment of the present invention the ratio of H/W1 is between 0.3-0.5, with a specific example being a ration of H/W1 of 0.4.

Figure 3B:
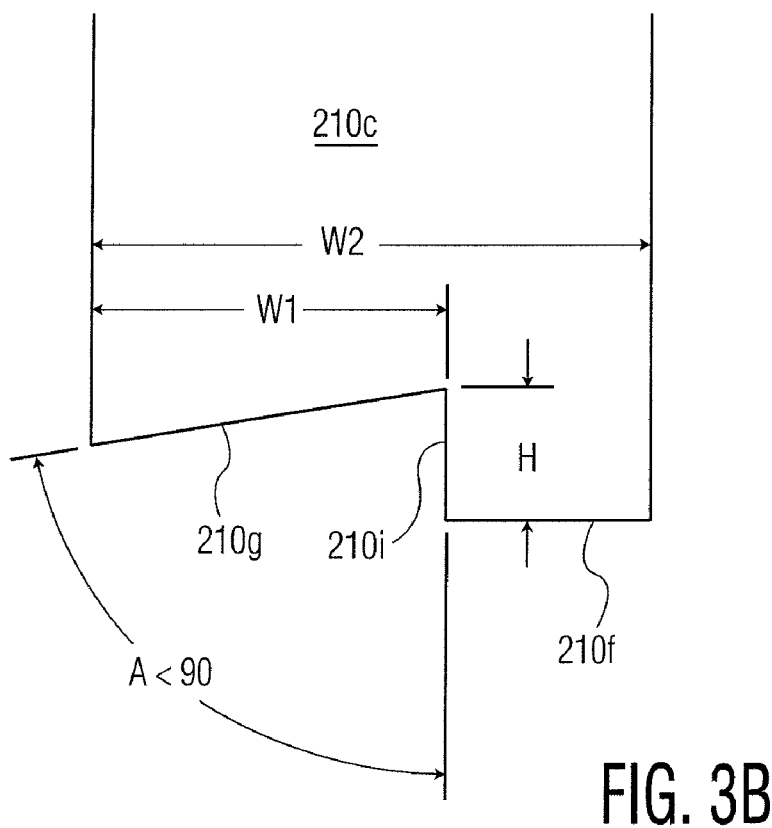
FIG. 3B is a partial view of an end tooth of a coil assembly of a linear motor in accordance with another exemplary embodiment of the present invention.

FIG. 3B is a partial view of end tooth 210c from linear motor 200 illustrated in FIG. 2 (and labeled as "B" in FIG. 2). As shown in FIG. 3B, the end profile of end tooth 210c includes first surface 210f and second surface 210g separated by step 210i. As illustrated by viewing FIGS. 2 and 3B in the aggregate, step 210i is substantially perpendicular to plane 206. First surface 210f is substantially parallel to plane 206, and second surface 210g is configured at an acute angle "A" with respect to step 210i. According to a preferred embodiment of the present invention, the acute angle "A" between second surface 210g and step 210i is between 60-90 degrees.

In contrast to end teeth 110c and 110d in FIG. 1, end teeth 210c and 210d in FIG. 2 do not include a flanged portion (e.g., flanged portion 110h of end tooth 110c).

Similarly to FIG. 3A, FIG. 3B also illustrates widths "W1" and "W2," and height "H." For example, according to an exemplary embodiment of the present invention the ratio of W1/W2 is between 0.4-0.7, with a specific example being a ratio of W1/W2 of 0.6. For example, according to an exemplary embodiment of the present invention the ratio of H/W1 is between 0.3-0.5, with a specific example being a ratio of H/W1 of 0.4.

FIGS. 4A, 4B, 5A, and 5B are additional examples of end tooth profiles according to exemplary embodiments of the present invention where each exemplary profile includes a step between a first surface and a second surface of the end profile of the end tooth. While each of these exemplary figures shows a portion of only a single end tooth, it is understood that two such end teeth may be provided, for example, as illustrated in FIGS. 1-2 (i.e., where the end teeth are mirror images of one another).

Figure 4A:
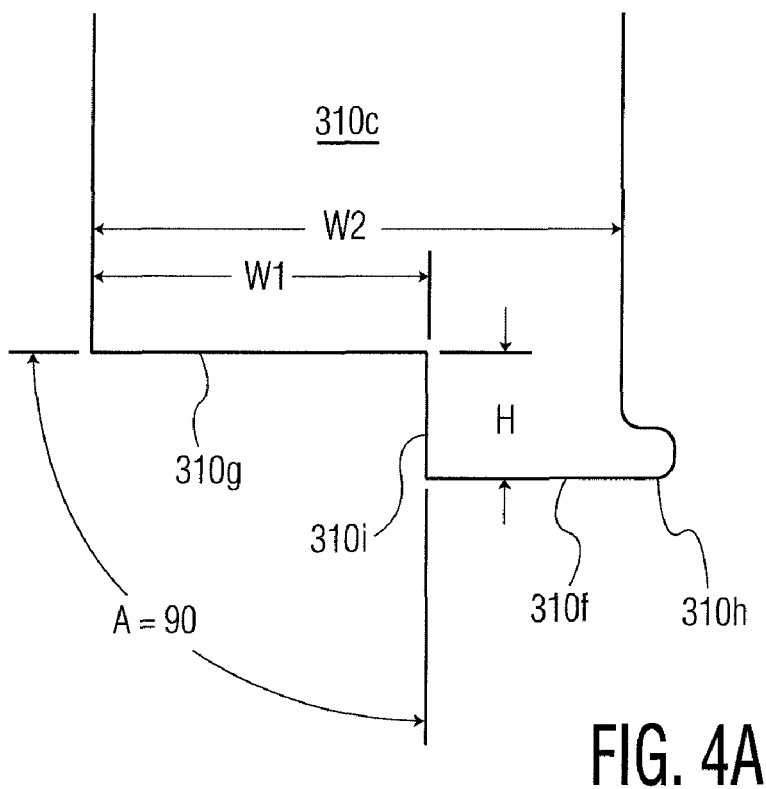
FIG. 4A is a partial view of an end tooth of a coil assembly of a linear motor in accordance with yet another exemplary embodiment of the present invention.

FIG. 4A is a partial view of end tooth 310c configured for use in a linear motor such as that illustrated in FIGS. 1-2. As shown in FIG. 4A, the end profile of end tooth 310c includes first surface 310f and second surface 310g separated by step 310i. Step 310i is substantially perpendicular to a plane defined by a plurality of permanent magnets (e.g., a plane similar to planes 106/206 shown in FIGS. 1-2). Each of first surface 310f and second surface 310g is substantially parallel to the plane defined by the plurality of permanent magnets, and as such, an angle "A" defined between second surface 310g and step 310i is approximately 90 degrees. Similar to end tooth 110c illustrated in FIG. 3A, end tooth 310c includes flanged portion 310h.

Figure 4B:
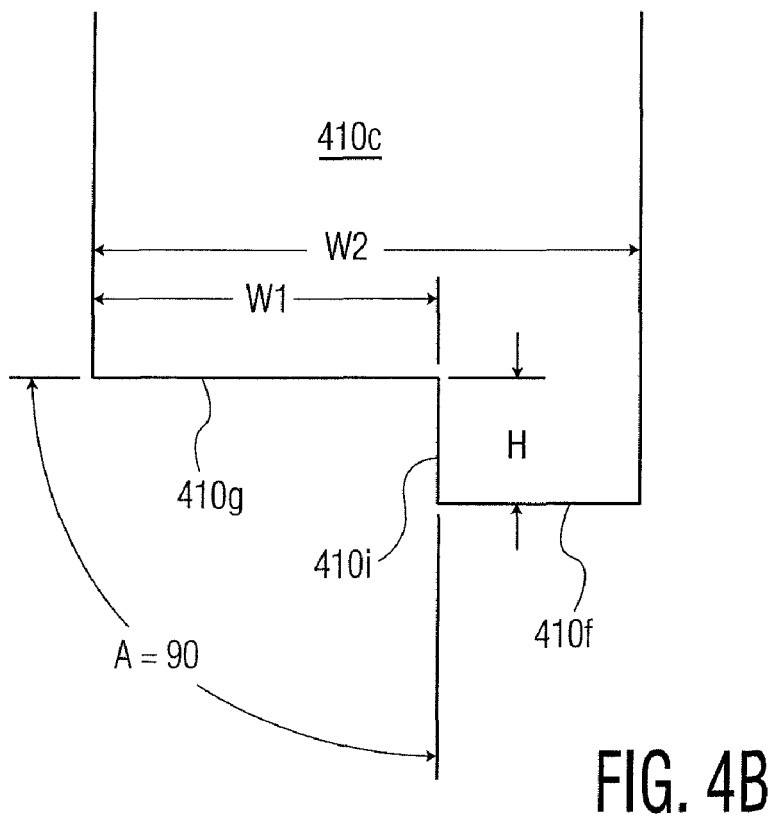
FIG. 4B is a partial view of an end tooth of a coil assembly of a linear motor in accordance with yet another exemplary embodiment of the present invention.

FIG. 4B is a partial view of end tooth 410c configured for use in a linear motor such as that illustrated in FIGS. 1-2. As shown in FIG. 4B, the end profile of end tooth 410c includes first surface 410f and second surface 410g separated by step 410i. Step 410i is substantially perpendicular to a plane defined by a plurality of permanent magnets (e.g., a plane similar to planes 106/206 shown in FIGS. 1-2). Each of first surface 410f and second surface 410g is substantially parallel to the plane defined by the plurality of permanent magnets, and as such, an angle "A" defined between second surface 410g and step 410i is approximately 90 degrees. Similar to end tooth 210c illustrated in FIG. 3B, end tooth 410c does not include a flanged portion (e.g., such as flanged portion 110h of end tooth 110c).

Figure 5A:
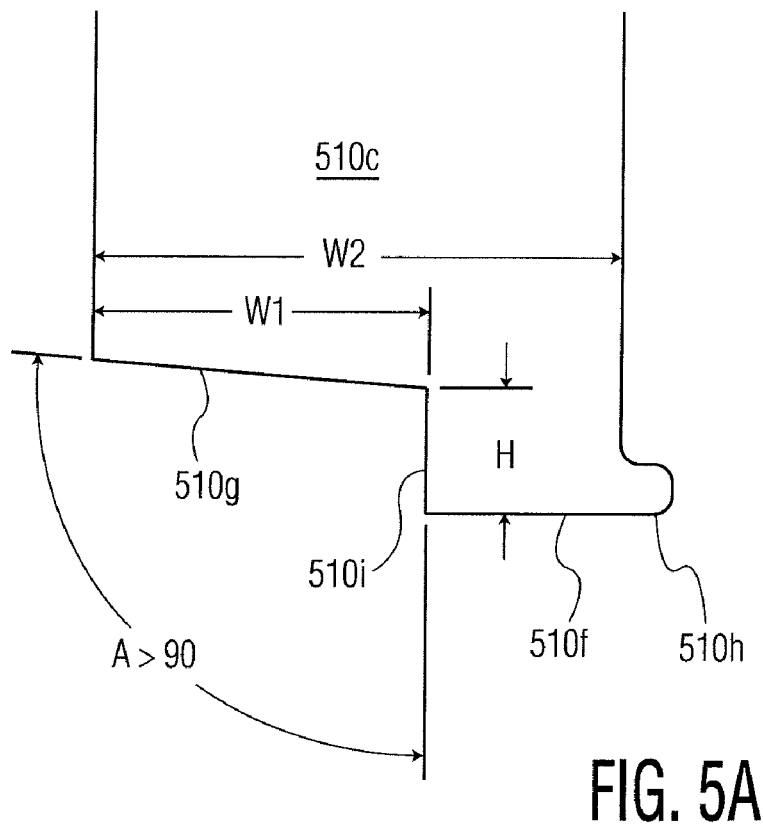
FIG. 5A is a partial view of an end tooth of a coil assembly of a linear motor in accordance with yet another exemplary embodiment of the present invention.

FIG. 5A is a partial view of end tooth 510c configured for use in a linear motor such as that illustrated in FIGS. 1-2. As shown in FIG. 5A, the end profile of end tooth 510c includes first surface 510f and second surface 510g separated by step 510i. Step 510i is substantially perpendicular to a plane defined by a plurality of permanent magnets (e.g., a plane similar to planes 106/206 shown in FIGS. 1-2). First surface 510f is substantially parallel to the plane defined by the plurality of permanent magnets. Second surface 510g is configured at an obtuse angle "A" with respect to step 510i. According to a preferred embodiment of the present invention, the obtuse angle "A" between second surface 510g and step 510i is between 90-120 degrees. Similar to end tooth 110c illustrated in FIG. 3A, end tooth 510c includes flanged portion 510h.

Figure 5B:
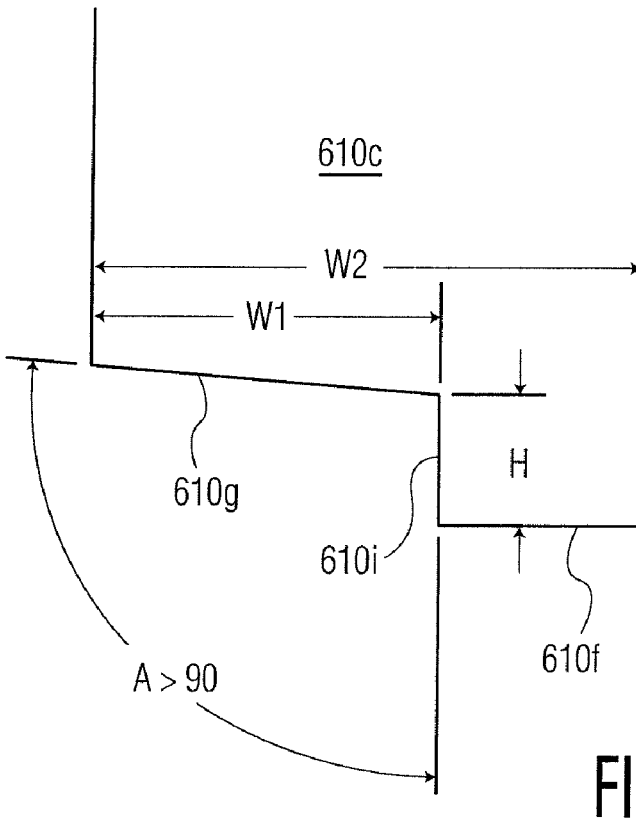
FIG. 5B is a partial view of an end tooth of a coil assembly of a linear motor in accordance with yet another exemplary embodiment of the present invention.

FIG. 5B is a partial view of end tooth 610c configured for use in a linear motor such as that illustrated in FIGS. 1-2. As shown in FIG. 5B, the end profile of end tooth 610c includes first surface 610f and second surface 610g separated by step 610i. Step 610i is substantially perpendicular to a plane defined by a plurality of permanent magnets (e.g., a plane similar to planes 106/206 shown in FIGS. 1-2). First surface 610f is substantially parallel to the plane defined by the plurality of permanent magnets Second surface 610g is configured at an obtuse angle "A" with respect to step 610i. According to a preferred embodiment of the present invention, the obtuse angle "A" between second surface 610g and step 610i is between 90-120 degrees. Similar to end tooth 210c illustrated in FIG. 3B, end tooth 610c does not include a flanged portion (e.g., such as flanged portion 110h of end tooth 110c).

Each of end teeth 310c, 410c, 510c, and 610c (respectively illustrated in FIGS. 4A, 4B, 5A, and 5B) defines widths "W1" and "W2," and height "H." As with end teeth 110c and 210c described above, according to an exemplary embodiment of the present invention the ratio of W1/W2 for each of end teeth 310c, 410c, 510c, and 610c is between 0.4-0.7, with a specific example being a ratio of W1/W2 of 0.6. Likewise, according to an exemplary embodiment of the present invention the ratio of H/W1 for each of end teeth 310c, 410c, 510c, and 610c is between 0.3-0.5, with a specific example being a ratio of H/W1 of 0.4.

It is noteworthy that, in contrast to the width W1 in FIGS. 3A-3B and FIGS. 5A-5B, width W1 in FIGS. 4A-4B is the same as the length of the second surface (i.e., second surface 310g in FIG. 4A, second surface 410g in FIG. 4B).

Referring again to exemplary linear motors 100 and 200 shown in FIGS. 1-2 (wherein such linear motor may utilize any end tooth within the scope of the present invention, including those shown in FIGS. 3A-3B, 4A-4B, and 5A-5B), either of the magnet track and the coil assembly may be the fixed member of the linear motor (i.e., a stator), while the other of the magnet track and the coil assembly may be the moving member of the linear motor.

As is known to those skilled in the art, a number of features of a linear motor may be optimized to achieve a desired result such as cogging reduction. For example, such features may include: (1) a spacing or pitch of the permanent magnets included in the magnet track; (2) the spacing or pitch of the plurality of teeth of the coil assembly; (3) the width of the slots between the teeth; (4) the length of the teeth, amongst other features. These features may be optimized independently, or in conjunction with one another, to achieve a desired result (e.g., cogging reduction through phase shifting).

The linear motor of the present invention may find application in a number of technical fields. One exemplary area of use is with a wire bonding machine, wherein a linear motor according to the present invention may be used to provide linear motion along the x-axis or the y-axis, or both. More specifically, for example, such linear motors may be used to provide linear motion to a bond head assembly of a wire bonding machine along the x-axis of the bond head assembly, the y-axis of the bond head assembly, or both. Of course, the linear motor of the present invention will find use in any of a number of other technical fields where a reduction in cogging is desired.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. A linear motor comprising:
  a magnet track including a plurality of permanent magnets; and
  a coil assembly including a plurality of laminations, the coil assembly defining a plurality of teeth having slots therebetween, the plurality of teeth including (1) two end teeth and (2) at least one non-end tooth arranged between the two end teeth, each of the two end teeth defining an end profile including a first surface and a second surface, the first surface and the second surface being separated by a step which is substantially perpendicular to a plane defined by the plurality of magnets, the coil assembly also including a plurality of coils at least partially disposed in at least a portion of the slots defined by the plurality of teeth, where the first surface is closer to the at least one non-end tooth than the second surface, and the second surface is configured at an acute angle with respect to the step.

2. The linear motor of claim 1 wherein the first surface is substantially parallel to the plane defined by the plurality of magnets.

3. The linear motor of claim 1 wherein a ratio of (1) a height of the step to (2) a width of the second surface is between 0.3-0.5.

4. The linear motor of claim 1 wherein a ratio of (1) a width of the second surface to (2) a width of the end tooth is between 0.4-0.7.

5. The linear motor of claim 1 wherein the step is a downward step if the first surface is considered to be the top of the plurality of laminations and the second surface is beneath the first surface.

6. The linear motor of claim 1 wherein the second surface is configured at an angle between 60-90 degrees with respect to the step.

7. The linear motor of claim 1 wherein the at least one non-end tooth includes a flanged portion at an end thereof, the flanged portion being wider than the remainder of the at least one non-end tooth.

8. The linear motor of claim 1 wherein the at least one non-end tooth has a substantially constant width along its entire length.

9. A linear motor comprising:
   a magnet track including a plurality of permanent magnets; and
   a coil assembly including a plurality of laminations, the coil assembly defining a plurality of teeth having slots therebetween, the plurality of teeth including (1) two end teeth and (2) at least one non-end tooth arranged between the two end teeth, each of the two end teeth defining an end profile including a first surface and a second surface, the first surface and the second surface being separated by a step which is substantially perpendicular to a plane defined by the plurality of magnets, the coil assembly also including a plurality of coils at least partially disposed in at least a portion of the slots defined by the plurality of teeth, where the first surface is closer to the at least one non-end tooth than the second surface, and the second surface is configured at an obtuse angle with respect to the step.

10. The linear motor of claim 9 wherein the second surface is configured at an angle between 90-120 degrees with respect to the step.

11. The linear motor of claim 9 wherein the first surface is substantially parallel to the plane defined by the plurality of magnets.

12. The linear motor of claim 9 wherein a ratio of (1) a height of the step to (2) a width of the second surface is between 0.3-0.5.

13. The linear motor of claim 9 wherein a ratio of (1) a width of the second surface to (2) a width of the end tooth is between 0.4-0.7.

14. The linear motor of claim 9 wherein the step is a downward step if the first surface is considered to be the top of the plurality of laminations and the second surface is beneath the first surface.

15. The linear motor of claim 9 wherein the at least one non-end tooth includes a flanged portion at an end thereof, the flanged portion being wider than the remainder of the at least one non-end tooth.

16. The linear motor of claim 9 wherein the at least one non-end tooth has a substantially constant width along its entire length.

* * * * *